United States Patent
Sanders (10) Patent No.: US 12,200,845 B2
(45) Date of Patent: Jan. 14, 2025

(54) PARALLEL REPEATER NETWORK FORMATION

(71) Applicant: ABL IP HOLDING LLC, Conyers, GA (US)

(72) Inventor: Alan David Sanders, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 96 days.

(21) Appl. No.: 18/109,635

(22) Filed: Feb. 14, 2023

(65) Prior Publication Data

US 2024/0276623 A1 Aug. 15, 2024

(51) Int. Cl.
H05B 47/19 (2020.01)
H04W 88/16 (2009.01)

(52) U.S. Cl.
CPC ............ H05B 47/19 (2020.01); *H04W 88/16* (2013.01)

(58) Field of Classification Search
CPC ............................... H05B 47/19; H04W 88/16
USPC ........................................................ 315/291
See application file for complete search history.

(56) References Cited

U.S. PATENT DOCUMENTS

| | | | |
|---|---|---|---|
| 5,343,466 A | 8/1994 | Kawamura | |
| 5,974,236 A | 10/1999 | Sherman | |
| 9,531,632 B2 | 12/2016 | Hellhake et al. | |
| 9,820,361 B1 * | 11/2017 | Turvy, Jr. | ............... H04M 11/00 |
| 9,883,570 B1 * | 1/2018 | Turvy, Jr. | ............... H05B 47/11 |
| 11,979,961 B2 * | 5/2024 | Zaveruha | ............... H05B 47/22 |
| 12,068,881 B2 * | 8/2024 | Barna | ................. H04L 12/4625 |
| 2002/0042274 A1 | 4/2002 | Ades | |
| 2003/0109270 A1 | 6/2003 | Shorty | |
| 2004/0218548 A1 | 11/2004 | Kennedy et al. | |
| 2012/0076007 A1 | 3/2012 | Nelson | |
| 2014/0040483 A1 | 2/2014 | Van Dussen et al. | |
| 2018/0026839 A1 | 1/2018 | Hollinger et al. | |
| 2022/0046707 A1 * | 2/2022 | Sanders | ............... H04W 74/04 |

(Continued)

OTHER PUBLICATIONS

Centenaro et al. "Long-Range Communications in Unlicensed Bands: The Rising Stars in the IOT and Smart City Scenarios." IEEE Wireless Communications 23.5, Oct. 2016, pp. 60-67.

(Continued)

*Primary Examiner* — Ryan Jager
(74) *Attorney, Agent, or Firm* — Buchanan Ingersoll & Rooney PC (57) ABSTRACT

A method includes awaiting for a gateway period, at a lighting system element of a lighting control group, for zero or more gateway messages from a gateway over a wireless communication network; tracking, at the lighting system element, zero or more gateway messages from the gateway that are received; and, in response to the zero or more gateway messages received, requesting designation of a gateway repeater to communicate with the gateway. The method further includes awaiting for a controller period, at the lighting system element, for zero or more controller messages from a local lighting zone controller over the wireless communication network; tracking, at the lighting system element, the zero or more controller messages from the local lighting zone controller that are received; and, in response to the zero or more controller messages, requesting designation of a local lighting zone repeater to communicate with the local lighting zone controller.

20 Claims, 7 Drawing Sheets

(56) References Cited

U.S. PATENT DOCUMENTS

2023/0052427 A1* 2/2023 Sanders ................ H04L 43/10
2024/0276623 A1* 8/2024 Sanders ................ H05B 47/19

OTHER PUBLICATIONS

Non Final Office Action for U.S. Appl. No. 16/662,691, dated Mar. 8, 2021, 11 pages.
Non Final Office Action for U.S. Appl. No. 16/825,264, dated Jul. 23, 2021, 34 pages.
Notice of Allowance for U.S. Appl. No. 16/662,691, mailed Mar. 29, 2021, 5 pages.
Qayyum et al. "Multipoint Relaying for Flooding Broadcast Messages in Mobile Wireless Networks," 35th Annual Hawaii International Conference on System Sciences (HICSS'2002). Maui, United States, pp. 3386-3875.

* cited by examiner

PARALLEL REPEATER NETWORK FORMATION

BACKGROUND

Lighting networks controlled by digital signals transmit a range of signals between a variety of network nodes or lighting system elements (LSEs). The lighting networks can be configured as flood mesh networks, where every network node which receives a given message, re-broadcasts that message in an attempt to ensure that any intended recipients ultimately receive the message.

However, in large distributed flood mesh networks, a strategy of indiscriminately forwarding all messages can lead to broadcast storms, where high numbers of network packets are transmitted and re-transmitted in a short period of time. A distributed flood mesh network with no preventative strategies to avoid broadcast storms can experience messages being rapidly re-broadcast indefinitely, ultimately stifling all effective communication and essentially bringing the communication within the network offline.

Some flood mesh networks solve this problem by directing only certain network nodes to re-broadcast messages. Those certain network nodes, often called repeaters, include a list or map of network nodes which directly or indirectly depend upon a given repeater to receive messages sent throughout the network. While these repeaters can essentially translate a flood mesh network into a tree network or star network, the repeaters do not distinguish between the role of messages. In lighting networks, there are some messages which are intended for all network nodes to receive. Additionally, lighting networks tend to also have smaller clusters representing local lighting zones (e.g., a luminaire and a corresponding light switch). Local lighting zones often engage in inter-zone communications, which ultimately do not concern the larger lighting network. Transmitting inter-zone communications throughout the disinterested remainder of the lighting network wastes network bandwidth and distracts processing power in the network nodes which could be put to better use. If the lighting network is large enough, it may be impossible to transmit all inter-zone communications throughout the lighting network without stifling all effective communication and bringing down the functionality of the lighting network.

An improved networking protocol implementing parallel message repeating strategies and topologies within a flood mesh-based lighting system is needed to overcome these and other limitations in the art.

SUMMARY

Techniques are described herein relating to a parallel repeater programming protocol of the lighting system elements of a lighting system. The parallel repeater programming protocol described herein can apply two or more separate network topologies over a flood mesh lighting system network in order to efficiently route network control messages throughout the lighting system network, as well as to route lighting zone control messages within isolated lighting control groups.

In a first example, a method includes awaiting for a gateway time period 160, at a lighting system element 4A, for zero or more gateway messages 170A from a gateway 9 over a wireless communication network 25. The method further includes tracking, at the lighting system element 4A, the zero or more gateway messages 161 from the gateway 9 that are received. The method further includes, in response to the zero or more gateway messages 161 received, requesting designation of a gateway repeater to communicate with the gateway 9. The method further includes awaiting for a controller time period 180, at the lighting system element 4A, for zero or more controller messages 170C from a local lighting zone controller 18A over the wireless communication network 25. The method further includes tracking, at the lighting system element 4A, the zero or more controller messages 181 from the local lighting zone controller 18A that are received. The method further includes, in response to the number of received controller messages 181 being below the received controller threshold 182, requesting designation of a local lighting zone controller repeater to communicate with the local lighting zone controller 18A.

In a second example, a non-transitory machine-readable medium includes parallel repeater programming 135 configured to store therein instructions to lighting system elements 4A-O for establishing parallel repeater networks. Execution of the parallel repeater programming 135 by a processor 131 configures the one or more lighting system elements 4A-O to implement the following functions. The one or more lighting system elements 4A-O await for a gateway time period 160, at a lighting system element 4A for zero or more gateway messages 170A from a gateway 9 over a wireless communication network 25. The one or more lighting system elements 4A-O track, at the lighting system element 4A, the zero or more gateway messages 161 from the gateway 9 that are received. The one or more lighting system elements 4A-O, in response to the zero or more gateway messages 161 being below the received gateway threshold 162, request designation of a gateway repeater to communicate with the gateway 9. The one or more lighting system elements 4A-O await for a controller time period 180, at the lighting system element 4A, for zero or more controller messages 170C from a local lighting zone controller 18A over the wireless communication network 25. The one or more lighting system elements 4A-O track, at the lighting system element 4A, the zero or more controller messages 181 from the local lighting zone controller 18A that are received. The one or more lighting system elements 4A-O, in response to the zero or more controller messages 181 received, request designation of a local lighting zone controller repeater to communicate with the local lighting zone controller 18A.

BRIEF DESCRIPTION OF THE DRAWINGS

The drawing figures depict one or more implementations in accord with the present teachings, by way of example only, not by way of limitation. In the figures, like reference numerals refer to the same or similar elements.

PARTS LISTING

4A-O Lighting System Element
8A-D Lighting Control Group
9 Network Controller (e.g., Gateway)
10A-K Luminaire
18A-D Local Lighting Zone Controller
20 Lighting System (e.g., RF Communication System)
21 Physical Space (e.g., On-Premises)
25 Wireless Communication Network
55 WAN
122A-C Lighting Control Device
123A Occupancy, Daylight, or Audio Sensor
130 Memory
131 Processor
132 Network Communication Interface
133 Driver Circuit
134 Illumination Light Source
135 Parallel Repeater Programming
136A-O Parallel Repeater Instance
146 Switches or Touch Screen Display
155 Drive/Sense Circuitry
156 Detectors
160 Gateway Time Period
161 Number of Gateway Messages
162 Received Gateway Threshold
163 Received Gateway Counter
164 Gateway Delay Period
170A Gateway Message
170B Gateway Repeater Designation Request
170C Controller Message
170D Local Lighting Zone Controller Repeater Designation Request
170E Network Packet
171 Flag
180 Controller Time Period
181 Number of Controller Messages
182 Received Controller Threshold
183 Received Controller Counter
184 Controller Delay Period
200 Parallel Repeater Programming Protocol
304A-L LSE (Lighting System Element)
309 Gateway
320 Lighting System
350A-E Room
404A-F LSE (Lighting System Element)
409 Gateway
420 Lighting System
508 Control Group

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals Reference now is made in detail to the examples illustrated in the accompanying drawings and discussed below.

Figure 1A:
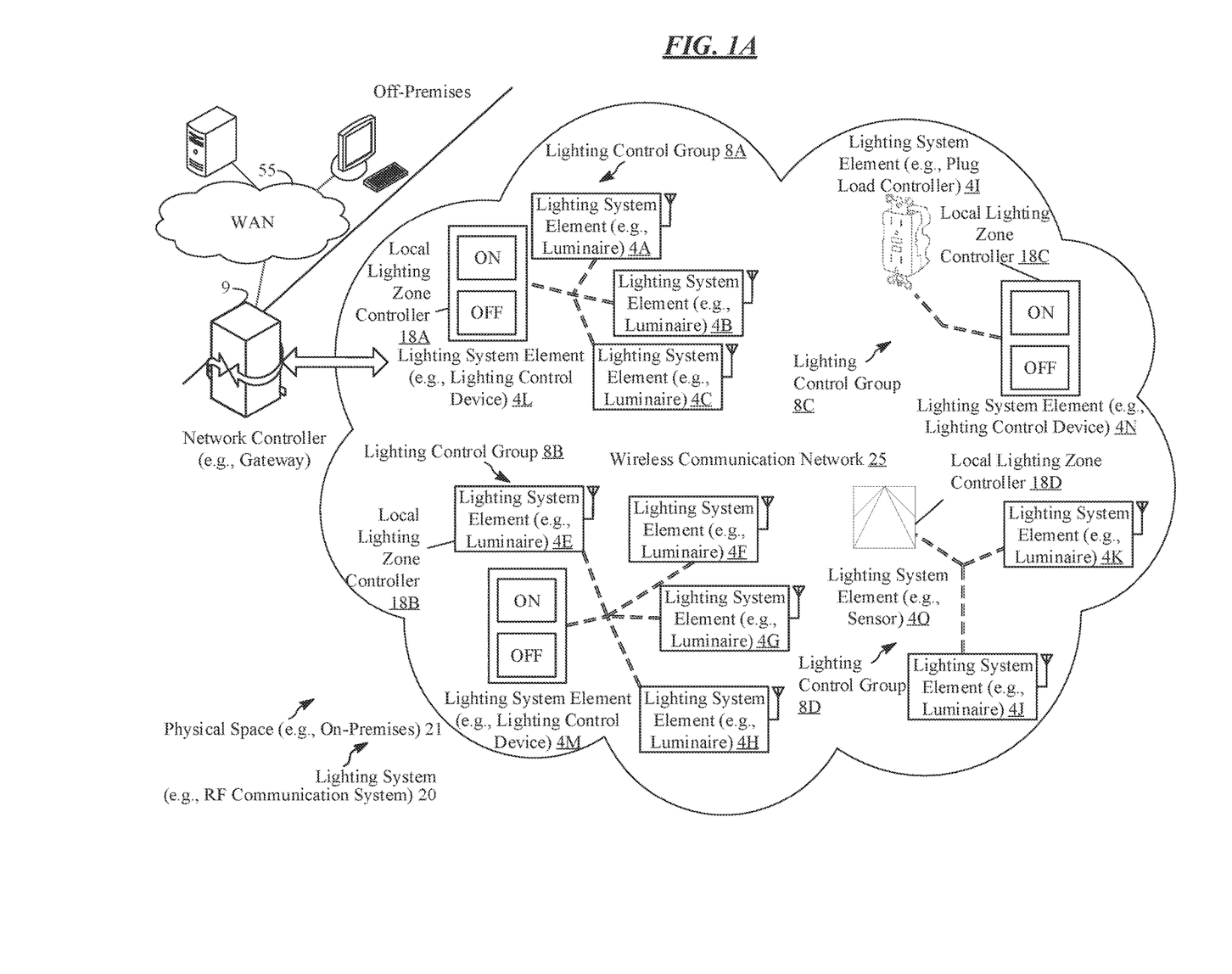
FIG. 1A depicts a lighting system with a gateway and fifteen lighting system elements organized into lighting control groups connected via a wireless communication network.
Figure 1B:
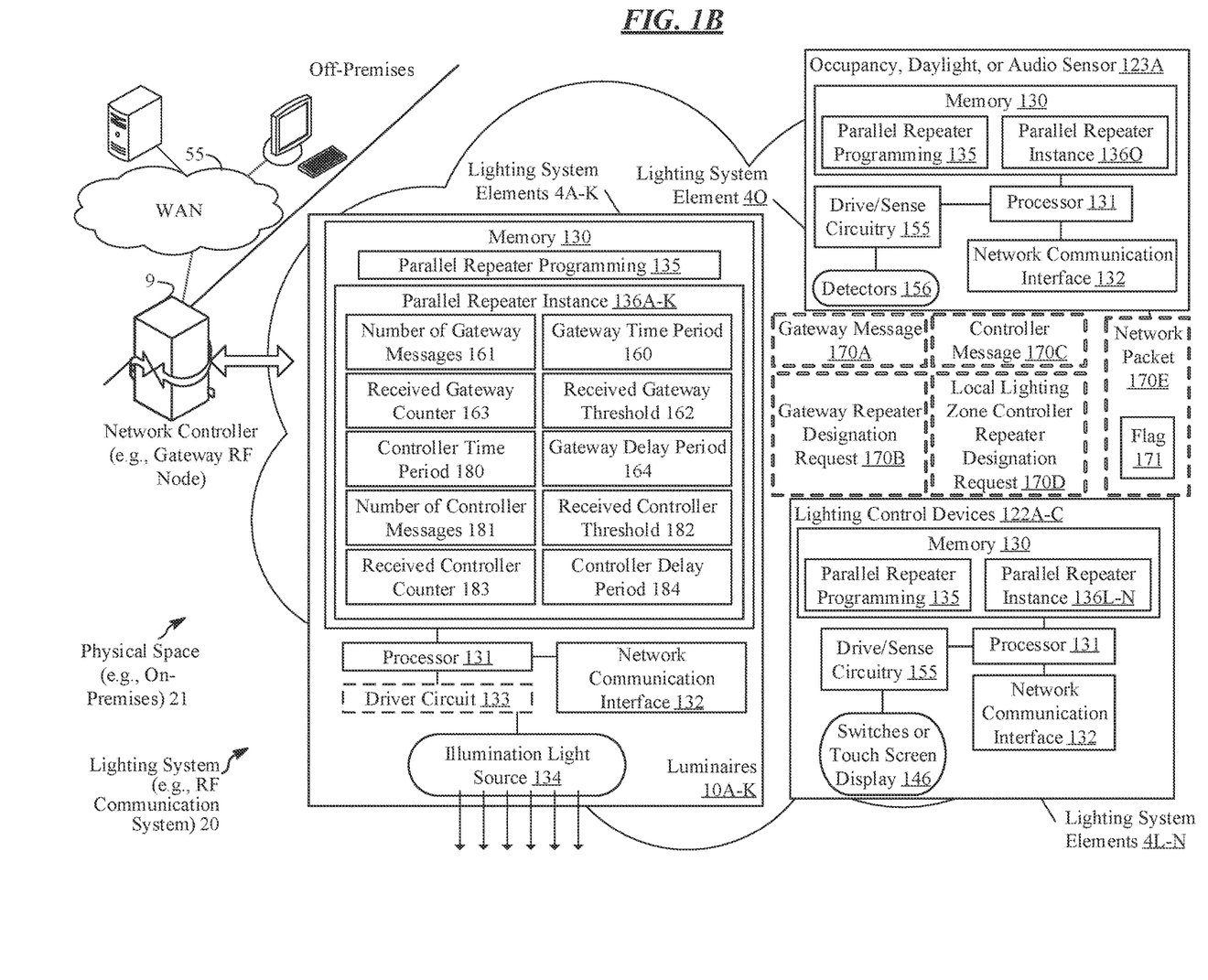
FIG. 1B depicts the lighting system of FIG. 1A, organized into categories of lighting system element and showing detailed hardware and software elements of the lighting system elements.

FIG. 1A depicts a lighting system 20 with a gateway 9 and fifteen lighting system elements 4A-O organized into lighting control groups 8A-D connected via a wireless communication network 25. FIG. 1B depicts the lighting system of FIG. 1A, organized into categories of lighting system element 4A-O and showing detailed hardware and software elements of the lighting system elements 4A-O. Lighting system 20 is a flood mesh network designed to route network control network packets 170E for the gateway 9 or network-wide messages over a subset of lighting system elements 4A-O in the flood mesh in order to distribute such messages while avoiding unduly repetitious broadcasts. To facilitate this routing, network packets 170E can include a flag 171 to indicate whether the network packet 170E is concerned with network control within the lighting network 20, or whether the network packet 170E is concerned with lighting zone control within a lighting control group 8A. Lighting system 20 is further designed to route network packets 170E for communicating within particular lighting control groups 8A-D within the respective lighting control group 8A to which a given network packet 170E relates. Lighting system 20 implements these routing strategies by requiring lighting system elements 4A-O to determine whether each lighting system element 4A-O is receiving both network control network packets 170E as well as lighting zone control network packets 170E.

A control group 8A is a functional grouping of lighting system elements 4A-C, L: in some examples, a control group 8A-D will include controlled devices, i.e., luminaires 10A-K or a plug load controller 41, which provides lighting or electricity respectively. A control group 8A-D will also include controlling devices, i.e., lighting control devices 122A-C and sensor 40, which provide instructions to associated controlled devices regarding how to provide lighting or electricity, or how to operate generally. Often, a control group 8A will constitute a lighting group, such as the ceiling lights in a given room, to be controlled in a collective manner; in other examples, however, the control group 8A may be grouped based on usage principles, e.g., all lights in all stairwells of the physical space 21, or all plug load controllers in a high flood-risk area.

A respective lighting system element 4A individually determines whether the lighting system element 4A is receiving network control network packets 170E by listening for a gateway messages 170A. A gateway message 170A can be sent directly from the gateway 9, or can be forwarded by another lighting system element 4B. If the number of gateway messages 161 received is less than a received gateway threshold 162 during a gateway delay period 164, the respective lighting system element 4A determines that network control network packets 170E may be going received, and so the lighting system element 4A broadcasts a gateway repeater designation request 170B, requesting at least one of nearby lighting system elements 4B-C, L to repeat any network control network packets 170E being received by the lighting system elements 4B-C, L. In some examples, further algorithms will select a particular lighting system element 4B to perform the forwarding based upon some criteria, with some exemplar criteria including the total number of hops to the gateway 9, the number of other lighting system elements 4C, I, L, N to which the particular lighting system element 4B is already forwarding, the RSSI strength of the particular lighting system element 4B, and the role of the lighting system element 4B (e.g., luminaire, lighting control device, sensor, plug load controller, etc.)

A respective lighting system element 4A individually determines whether the lighting system element 4A is receiving lighting zone control network packets 170E by listening for a controller messages 170C. A controller message 170C can be sent directly from a local lighting zone controller 18A, or can be forwarded by another lighting system element 4B. Each lighting control group 8A has one local lighting zone controller 18A. If the number of controller messages 181 received is less than a received controller threshold 182 during a controller delay period 184, the respective lighting system element 4A determines that lighting zone control network packets 170E may be going received, and so the lighting system element 4A broadcasts a local lighting zone controller repeater designation request 170D, requesting nearby lighting system elements 4B-C to repeat any lighting zone control network packets 170E being received by the lighting system elements 4B-C. In some examples, further algorithms will select a particular lighting system element 4B to perform the forwarding based upon some criteria, with some exemplar criteria including the number of hops to the gateway, the number of other lighting system elements to which the particular lighting system element 4B is already forwarding, the RSSI strength of the particular lighting system element 4B, and the role of the lighting system element 4B (e.g., luminaire, lighting control device, sensor, plug load controller, etc.) In further examples, should a quorum of lighting system elements 4A-C determine that the local lighting zone controller 18A lighting system element 4L is unreachable, a new local lighting zone controller 18A can be selected from the connected lighting system elements 4A-C.

The terms "gateway" and "controller" are used to distinguish the roles as described in this application, and could be interchanged entirely throughout. The term "beacon" could also be used in lieu of "gateway" or "controller". The terms "heartbeat time period" "heartbeat message", "received heartbeat threshold", "heartbeat delay period" and "received heartbeat counter" could further be used interchangeably with "gateway time period" "gateway message", "gateway heartbeat threshold", "gateway delay period" and "received gateway counter". The terms "keepalive time period" "keepalive message", "received keepalive threshold", "keepalive delay period" and "received keepalive counter" could further be used interchangeably with "controller time period" "controller message", "controller heartbeat threshold", "controller delay period" and "received controller counter".

Lighting system elements 4A-O of the lighting system 20 are located in a physical space 21, such as a building. In the example, lighting system elements 4A-K are luminaires 10A-K; lighting system elements 4L-N are lighting control devices 122A-C; and lighting system element 40 is an occupancy, daylight, or audio sensors 123A. Luminaires 10A-K illuminate the physical space 21 or premises 21 to a level useful for a human in or passing through the physical space 21, e.g. general illumination of the physical space 21, such as a warehouse, room, or a corridor in a building; or of an outdoor space such as a street, sidewalk, parking lot or performance venue. Lighting control devices 122A-C can be wall switches or touch screen devices to turn on/off or dim luminaires 10A-K. Occupancy, daylight, or audio sensor 123A can enable controls for on/off, occupancy, and dimming of the luminaires 10A-K. Though only a single occupancy, daylight, or audio sensor 123A is depicted, the lighting system 20 can include any number of occupancy, daylight, or audio sensors 123A, in a multiplicity of formats or structures. Likewise, though multiple luminaires 10A-K and lighting control device 122A-C are depicted, the lighting system 20 can include any number of luminaires 10A-K or lighting control devices 122A-C, in a multiplicity of formats or structures.

As shown, luminaires 10A-K include an illumination light source 134 to emit illumination lighting for the physical space 21; and an optional driver circuit 133 coupled to the illumination light source 134 to control operation of the illumination light source 134. In some examples, the luminaires 10A-K may include a ballast instead of the driver circuit 133 depending on the type of illumination light source 134 (e.g., for a fluorescent or incandescent light bulb).

Luminaires 10A-K, as well as lighting control devices 122A-C and occupancy, daylight, or audio sensor 123A (the lighting system elements 4A-O) further include a network communication interface 132 configured for wireless or wired communication, for example, over the network 25. The lighting system elements 4A-O further include a memory 130; and a processor 131 coupled to the network communication interface 132 and the memory 130. The lighting system elements 4A-O further include parallel repeater programming 135, designed to implement the parallel repeater programming protocol 200 (see FIG. 2). Each lighting system element 4A-O also instantiates a parallel repeater instance 136A-O, which includes a number of memory objects 160-164, 180-184 in the respective memory 130 of the respective lighting system element. The values stored within the memory objects 160-164, 180-184 in a respective parallel repeater instance 136A may differ from the values stored within the memory objects 160-164, 180-184 in a different parallel repeater instance 136B—however, some memory objects 160-164, 180-184 may be set at a lighting system 20 level, resulting in identical values throughout the parallel repeater instances 136A-O.

The parallel repeater instances 136A-O include a gateway time period 160, which is a period of time during which one or more gateway messages 170A are listened for. A gateway delay period 164 comprises one or more gateway time periods 160, and represents the amount of total time the lighting system element 4A-O will wait for the requisite number of gateway messages 170A. The parallel repeater instances 136A-O further include a number of gateway messages 161, which is the number of gateway messages 170A received during the gateway delay period 164. In some examples, the number of gateway messages 161 received is determined by utilizing a received gateway counter 163 within the parallel repeater instances 136A-O, with the received gateway counter 163 incrementing each time an expected gateway message 170A is received during the gateway delay period 164. An expected gateway message 170A is received when a gateway message 170A does not arrive during a gateway time period 160. The parallel repeater instances 136A-O also include a received gateway threshold 162. Once the gateway delay period 164 elapses, the number of gateway messages 161 received is compared to the received gateway threshold 162: if the number of gateway messages 161 received is less than the received gateway threshold 162, the respective lighting system element 4A of the respective parallel repeater instance 136A with the number of gateway messages 161 received being below the received gateway threshold 162 will send a gateway repeater designation request 170B, in an attempt to reconnect to the gateway and receive network control network packets 170E.

The parallel repeater instances 136A-O include a controller time period 180, which is a period of time during which one or more controller messages 170C are listened for. A controller delay period 184 comprises one or more controller time periods 180, and represents the amount of total time the lighting system element 4A-O will wait for the requisite number of controller messages 170C. The parallel repeater instances 136A-O further include a number of controller messages 181, which is the number of controller messages 170C received during the controller delay period 184. In some examples, the number of controller messages 181 received is determined by utilizing a received controller counter 183 within the parallel repeater instances 136A-O, with the received controller counter 183 incrementing each time an expected controller message 170C is received during the controller delay period 184. An expected controller message 170C is received when a controller message 170C does not arrive during a controller time period 180. The parallel repeater instances 136A-O also include a received controller threshold 182. Once the controller time period 180 elapses, the number of controller messages 181 received is compared to the received controller threshold 182: if the number of controller messages 181 received is less than the received controller threshold 182, the respective lighting system element 4A of the respective parallel repeater instance 136A with the number of controller messages 181 received being below the received controller threshold 182 will send a local lighting zone controller repeater designation request 170D, in an attempt to reconnect to the local lighting zone controller 18A and receive lighting zone control network packets 170E.

As shown, the occupancy, daylight, and audio sensors 123A includes an on-board micro-control unit (MCU) that includes a memory 130 (volatile and non-volatile) and a central processing unit (CPU) 131. The occupancy, daylight, or audio sensor 123A has the processor 131 coupled to drive/sense circuitry 155 operable to control detectors 156 and a network communication interface 132. The memory 130 of the occupancy, daylight, or audio sensor 123A stores the parallel repeater programming 135 and a parallel repeater instance 1360.

The circuitry, hardware, and software of the lighting control devices 122A-C shown are similar to the occupancy, daylight, or audio, sensor 123A. Lighting control devices 122A-C can be a wall switch where the drive/sense circuitry 155 responds to switches 146. Switches 146 can be an on/off switch, dimmer switch, or set scene. Switches 146 can be a single shared button switch for on/off, dimming, or set scene functions. A button station can include various button settings that can have the lighting control settings adjusted, for example, four buttons can be arranged with two longitudinal buttons (north-south) and two lateral buttons (east-west). Alternatively, lighting control devices 122A-C can be a touchscreen device in which lighting control setting adjustments are inputted via a user interface application (not shown) through manipulation or gestures on a touch screen display 146. As shown, the memory 130 of the lighting control devices 122A-C stores the parallel repeater programming 135 and a parallel repeater instance 136L-N.

Figure 2:
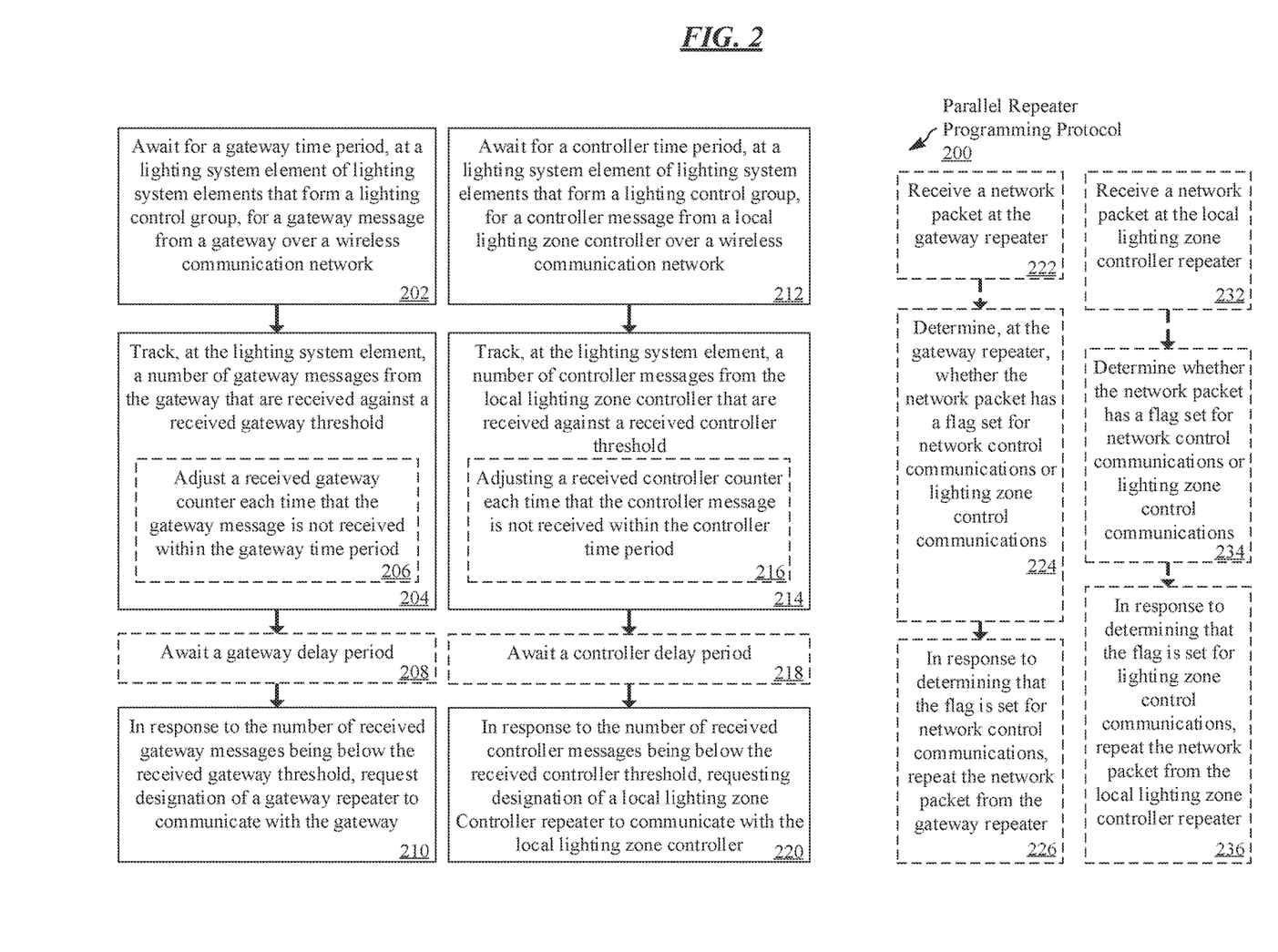
FIG. 2 is a parallel repeater programming protocol for the lighting system that is implemented by the gateway and lighting system elements.

FIG. 2 is a parallel repeater programming protocol 200 for the lighting system 20 that is implemented by the gateway 9 and lighting system elements 4A-O. Parallel repeater programming protocol 200 enables the lighting network 20 to reduce the repetition of network packets 170E to the intended recipient lighting system elements 4A-O, depending upon the category or flag 171 of the network packet 170E.

In the example of FIG. 2, blocks 202, 212, 222, and 232 can execute asynchronously and independently from one another. Blocks 202-210 are concerned with maintaining connections to facilitate network control network packets 170E. Blocks 212-220 are concerned with maintaining connections to facilitate lighting zone control network packets 170E. Blocks 222-226 are concerned with repeating network control network packets 170E based upon the connections maintained in blocks 202-210. Blocks 232-236 are concerned with repeating lighting zone control network packets 170E based upon the connections maintained in blocks 212-220.

The parallel repeater programming protocol 200 is implemented in the parallel repeater programming 135 of the lighting system elements 4A-O. Execution of the parallel repeater programming 135 stored in a memory 130 by a processor 131 of a given lighting system element 4A causes the given lighting system element 4A to implement blocks 202-210 and 212-220 described below. If the given lighting system element 4A is a gateway repeater for another lighting system element 4B, Execution of the parallel repeater programming 135 stored in a memory 130 by a process 131 of a given lighting system element 4A causes the given lighting system element 4A to implement blocks 222-226. If the given lighting system element 4A is a local lighting zone controller repeater for another lighting system element 4B, Execution of the parallel repeater programming 135 stored in the memory 130 by the processor 131 of the given lighting system element 4A causes the given lighting system element 4A to implement blocks 232-236.

Beginning in block 202, the parallel repeater programming protocol 200 includes awaiting for a gateway time period 160, at a lighting system element 4A of lighting system elements 4A-C, L that form a lighting control group 8A, for a gateway message 170A from a gateway 9 over a wireless communication network 25.

Next, in block 204, the parallel repeater programming protocol 200 includes tracking, at the lighting system element 4A, a number of gateway messages 166 from the gateway 9 that are received against a received gateway threshold 162. In some examples, block 204 includes the sub-block 206, where the parallel repeater programming protocol 200 includes adjusting a received gateway counter 163 each time that the gateway message 170A is not received within the gateway time period 160.

In some examples, particularly those which allow missing a percentage of gateway messages 170A, in block 208 the parallel repeater programming protocol 200 awaits a gateway delay period 164.

Finishing now in block 210, the parallel repeater programming protocol 200 includes, in response to the number of received gateway messages 161 being below the received gateway threshold 162, requesting designation of a gateway repeater 4B-C, L to communicate with the gateway 9. The request can be made by way of a gateway repeater designation request 170B.

Independently in block 212, the parallel repeater programming protocol 200 includes awaiting for a controller time period 180, at a lighting system element 4A of lighting system elements 4A-C, L that form a lighting control group 8A, for a controller message 170C from a local lighting zone controller 18A over a wireless communication network 25.

Next, in block 214, the parallel repeater programming protocol 200 includes tracking, at the lighting system element 4A, a number of controller messages 186 from the local lighting zone controller 18A that are received against a received controller threshold 182. In some examples, block 214 includes the sub-block 216, where the parallel repeater programming protocol 200 includes adjusting a received controller counter 183 each time that the controller message 170C is not received within the controller time period 180.

In some examples, particularly those which allow missing a percentage of controller messages 170C, in block 218 the parallel repeater programming protocol 200 awaits a controller delay period 184.

Finishing now in block 220, the parallel repeater programming protocol 200 includes, in response to the number of received controller messages 181 being below the received controller threshold 182, requesting designation of a local lighting zone controller repeater 4B-C to communicate with the local lighting zone controller 18A. The request can be made by way of a local lighting zone controller repeater designation request 170D.

In some examples, independently in block 222, the parallel repeater programming protocol 200 includes receiving a network packet 170E at the gateway 9 repeater. Next, in block 224, the parallel repeater programming protocol 200 includes determining, at the gateway 9 repeater, whether the network packet 170E has a flag set 171 for network control communications or lighting zone control communications. Finishing now in block 226, the parallel repeater programming protocol 200 includes, in response to determining that the flag 171 is set for network control communications, repeating the network packet 170E from the gateway 9 repeater.

In some examples, independently in block 232, the parallel repeater programming protocol 200 includes receiving a network packet 170E at the local lighting zone controller 18A repeater. Next, in block 234, the parallel repeater programming protocol 200 includes determining, whether the network packet 170E has a flag set 171 for network control communications or lighting zone control communications. Finishing now in block 236, the parallel repeater programming protocol 200 includes, in response to determining that the flag 171 is set for lighting zone control communications, repeating the network packet 170E from the local lighting zone controller 18A repeater.

Figure 3A:
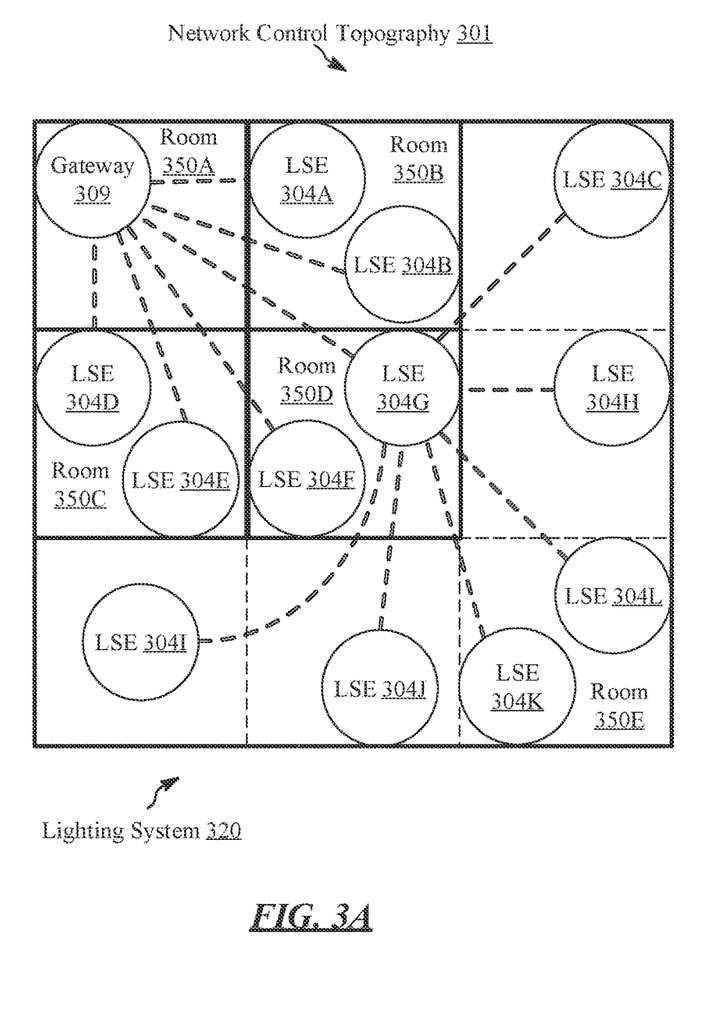
FIG. 3A depicts the network control topography of a comparison between the network topologies involved in the two parallel control networks implemented in the lighting system among the gateway and lighting system elements organized into lighting control groups separated by rooms.
Figure 3B:
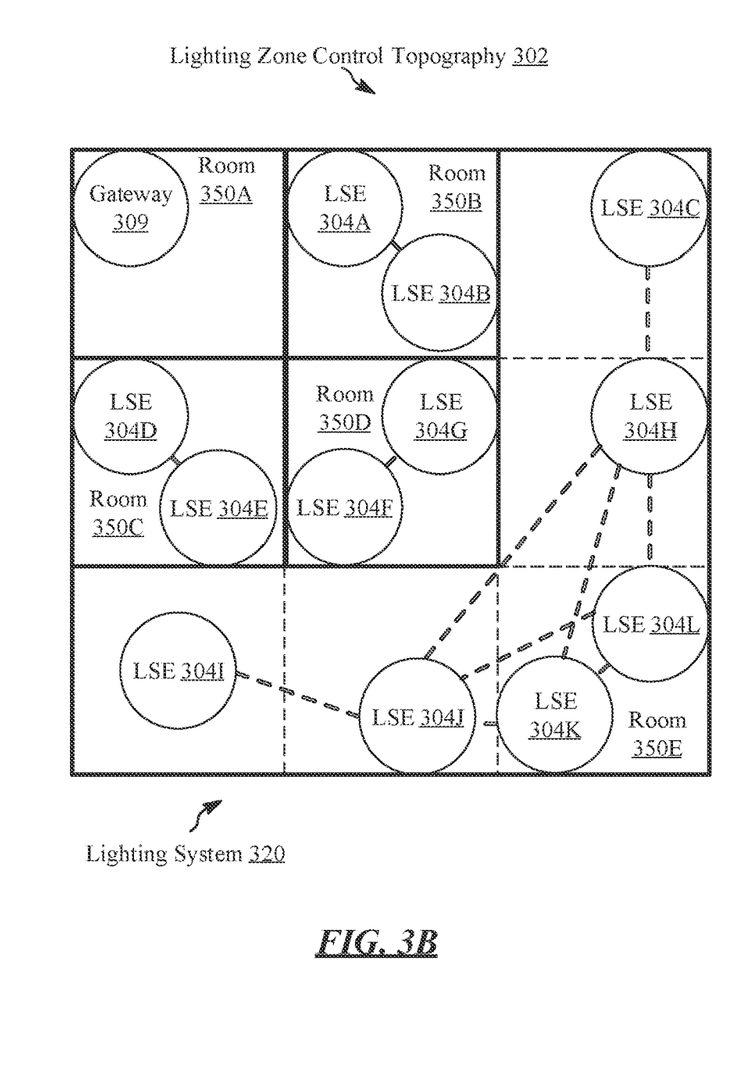
FIG. 3B depicts the lighting zone control topography of the comparison between the network topologies involved in the two parallel control networks implemented in the lighting system among the gateway and lighting system elements organized into lighting control groups separated by rooms.

FIGS. 3A-B are a comparison between the network topologies involved in the two parallel control networks implemented in the lighting system 320 among the gateway 309 and lighting system elements (LSEs) 304A-L organized into lighting control groups separated by rooms 350A-E. FIG. 3A depicts the network control topography 301, FIG. 3B depicts the lighting zone control topography 302.

In the example of FIGS. 3A-B, the physical premises 21 is divided into a three by three grid of square areas, sectioned into five rooms 350A-E. Four rooms 350A-D are a single square area in size, and one room 350E is five square areas in size. Each room 350A-E constitutes a control group like the control groups 8A-D of FIG. 1A. Any gateway 309 or LSE 304A-L is able to broadcast to any other LSE 304A-L or gateway 309 in the same or adjacent square area.

In the network control topography 301, the primary goal is to connect all of the LSEs 304A-L to the gateway 309, in some examples in as few hops as possible. The network control topography in this example is not concerned with the control groups, or the functioning of LSEs 304A-L in a manner that effectively produces illumination. Therefore, all of the LSEs 304A-B, D-G in the adjacent squares to the gateway 309 each have a direct connection to the gateway 309. The connections formed in the network control topography 301 are not designed to efficiently connect, for example, the LSE 304A and LSE 304B, even though both LSEs 304A-B are in the same room 350B and function as a control group. The remainder of the LSEs 304C, H-L, all adjacent to LSE 304G, connect to LSE 304G, thereby connecting to the gateway in one hop. In this example, the routing algorithm prefers to send network control packets 170E through as few LSEs as possible, and so all of the LSEs 304C, H-L not adjacent to the gateway 309 utilize the same LSE 304G, rather than LSE 304F, or the other LSEs 304A-B, D-E which can partially support the further LSEs 304C, H-L.

Comparatively, in the lighting zone control topography 302, the primary goal is to connect all of the LSEs in a given control group, or room 350A-E in this example. The lighting zone control topography 302 is not concerned with connections to the gateway 309, or connections between rooms 350A-E or control groups. Additionally, in this example, the lighting zone control topography 302 is directed to keeping lighting zone control network packets 170E within the particular room 350A-E: illustrating this is the relationship between LSE 304C and LSE 304I. LSE 304C and LSE 304I are two hops apart, routing lighting zone control communications through LSE 304J and LSE 304H. However, it would technically be possible for LSE 304I to route traffic to LSE 304C via LSE 304F or LSE 304G: doing so would transfer messages in a single hop rather than two, which would improve messaging efficiency. Moving lighting zone control traffic for room 350E through the LSEs 304F-G of room 350D would go against the lighting zone control topography 302 design for this example, and could increase overall broadcasts throughout the lighting system 320. Even though LSE 304F or LSE 304G will not repeat or rebroadcast lighting zone control messages from LSE 304I, LSE 304F and LSE 304G nevertheless hear these messages, and cannot receive other messages while incidentally hearing messages broadcast by LSE 304I, or any other LSE 304A-L. Therefore, in this example, all lighting zone control network traffic is only repeated by members of the sender's control group, by members of the sender's control group, for the benefit of a receiver in the sender's control group.

The network control topography 301 and lighting zone control topography 302 apply to repeating out network packets 170E, not receiving in network packets 170E. Unless the LSEs 304A-L or gateway 309 are configured to directionally broadcast, when a given LSE broadcasts, such as LSE 304H, all adjacent LSEs 304A-C, F-G, J-L will receive the broadcasted messages 170A-E. After the message 170A-E is received is when the network control topography 301 and lighting zone control topography 302 come into action, directing in this example LSE 304G to rebroadcast network control network packets 170E from LSE 304H, and directing LSE 304J to rebroadcast lighting zone control network packets 170E from LSE 304H (LSEs 304C, K-L do not rebroadcast as they do not connect to an LSE 304I which did not receive the original broadcast from LSE 304H.)

Figure 4A:
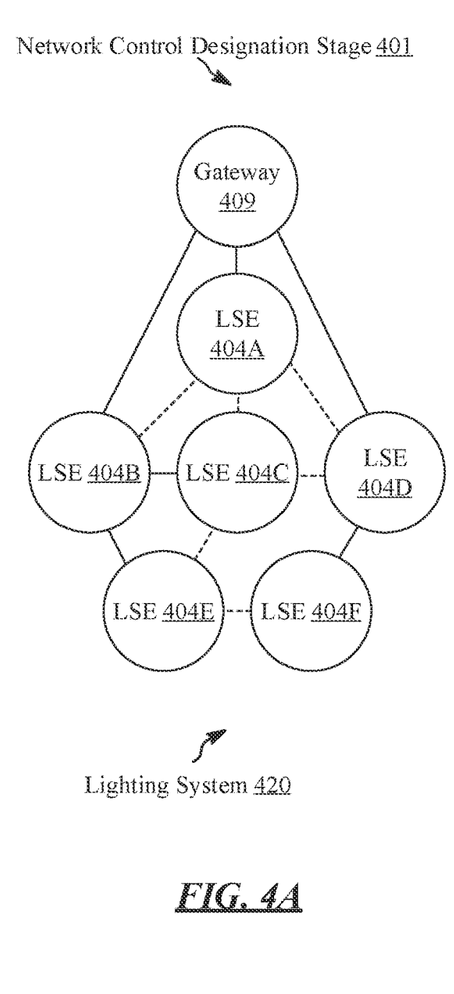
FIG. 4A depicts a lighting network including a gateway and six lighting system elements (LSEs) designating a new network control route when a lighting system element disconnects from the lighting network before the disconnection.
Figure 4B:
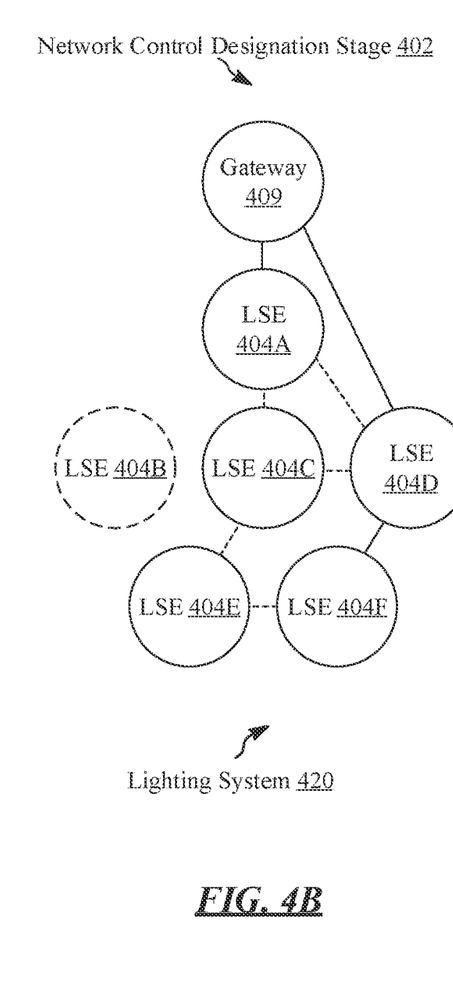
FIG. 4B depicts the lighting network including the gateway and six lighting system elements (LSEs) designating the new network control route when the lighting system element disconnects from the lighting network after the disconnection.
Figure 4C:
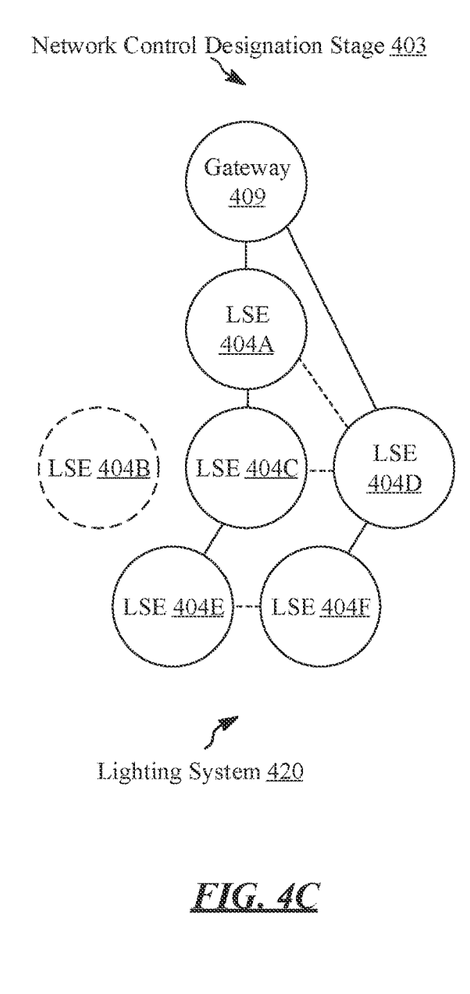
FIG. 4C depicts the lighting network including the gateway and six lighting system elements (LSEs) designating the new network control route when the lighting system element disconnects from the lighting network after designating a new network control route.

FIGS. 4A-C depict a lighting network 420 including a gateway 409 and six lighting system elements (LSEs) 404A-F designating a new network control route when a lighting system element 404B disconnects from the lighting network 420. FIG. 4A depicts the lighting network 420 before the disconnection, FIG. 4B depicts the lighting network 420 after the disconnection, and FIG. 4C depicts the lighting network 420 after designating a new network control route.

In FIGS. 4A-C, dotted lines represent potential repeater paths e.g., two LSEs 404A, D which hear each other's broadcasts but do not currently repeat network packets 170E directed to network control for one another. In some examples, repeater paths can be unidirectional, meaning LSE 404B re-broadcasts or repeat on behalf of LSE 404E, but LSE 404E does not re-broadcast or repeat on behalf of 404B.

In FIG. 4A, LSEs 404A, B, D are all directly connected to the gateway 409 in network control designation stage 401. LSE 404A repeats network control network packets 170E to and from the gateway 409 on behalf of LSE 404C. LSE 404B repeats network control network packets 170E to and from the gateway 409 on behalf of LSE 404E. LSE 404D repeats network control network packets 170E to and from the gateway 409 on behalf of LSE 404F. LSEs 404A-F in network control designation stage 401 prepare for an unexpected disconnection in the network control topography by executing the parallel repeater programming protocol 200, in particular steps 202-208.

In FIG. 4B, LSE 404B goes offline in network control designation stage 402. LSE 404E, executing the parallel repeater programming protocol 200, in particular steps 202-208 repeatedly in expectation of such an event, finds in step 210 that too many gateway messages 170A have been received, and LSE 404E is not connected, directly or indirectly, to the gateway 409. LSE 404E therefore sends a gateway repeater designation request 170B to any LSEs 404C, F which can hear LSE 404E. While networking graph strategies can vary, in this example LSE 404C is chosen at random from LSEs 404C, F.

LSE 404C will repeat gateway messages 170A and network control network packets 170E on behalf of LSE 404E. FIG. 4C shows the updated network in network control designation stage 403. In network control designation stage 403, the lighting system 420 has compensated for the disconnection of LSE 404B, and LSE 404E is re-connected via LSE 404A and LSE 404C to the gateway 409.

Figure 5A:
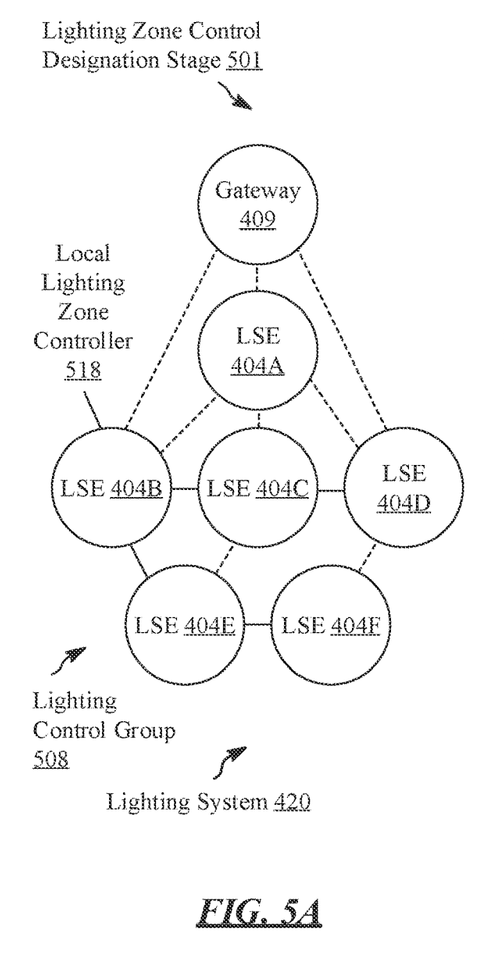
FIG. 5A depicts a lighting network including a gateway and six LSEs designating a new lighting zone control route when a lighting system element disconnects from the lighting network before the disconnection.
Figure 5B:
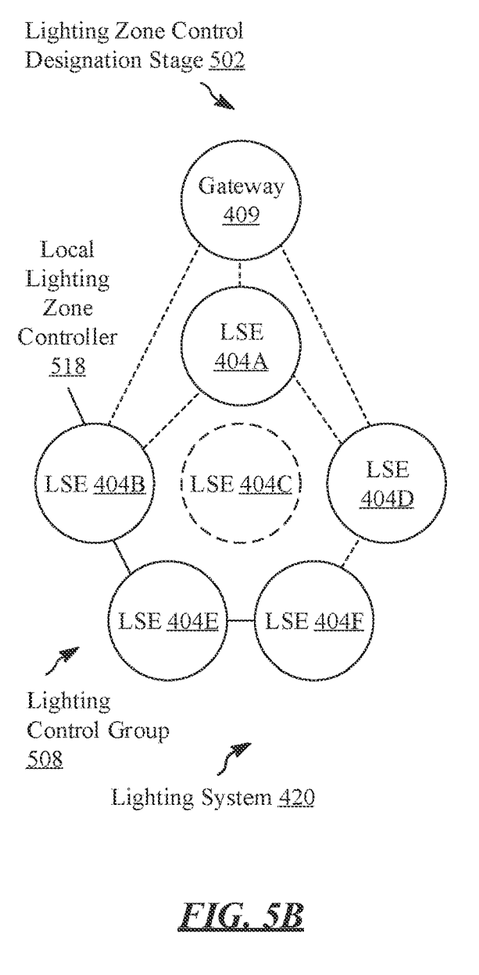
FIG. 5B depicts the lighting network including the gateway and six LSEs designating the new lighting zone control route when the lighting system element disconnects from the lighting network after the disconnection.
Figure 5C:
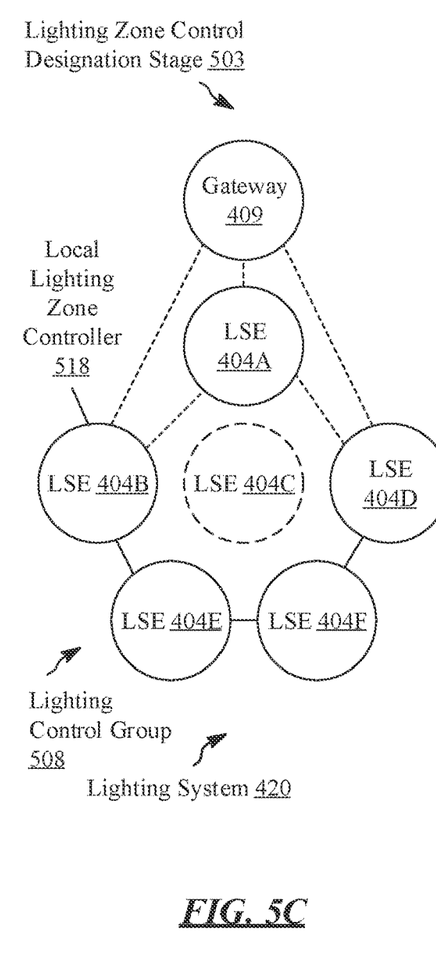
FIG. 5C depicts the lighting network including the gateway and six LSEs designating the new lighting zone control route when the lighting system element disconnects from the lighting network after designating a new lighting zone control route.

FIGS. 5A-C depicts a lighting network 420 including a gateway 409 and six lighting system elements (LSEs) 404A-F designating a new lighting zone control route when a lighting system element 404B disconnects from the lighting network 420. FIG. 5A depicts the lighting network 420 before the disconnection, FIG. 5B depicts the lighting network 420 after the disconnection, and FIG. 5C depicts the lighting network 420 after designating a new lighting zone control route.

In FIG. 5A, LSEs 404B-F form a control group 508. LSE 404A is part of another, separate control group. The LSEs 404A-F are not connected to the gateway 409 for lighting control purposes in in lighting zone control designation stage 501. LSEs 404B-F repeats lighting zone control network packets 170E amongst the control group 508. LSEs 404B-F in lighting zone control designation stage 501 prepare for an unexpected disconnection in the lighting zone control topography within the control group 508 by executing the parallel repeater programming protocol 200, in particular steps 212-218.

In FIG. 5B, LSE 404C goes offline in lighting zone control designation stage 502. LSE 404D, now isolated but executing the parallel repeater programming protocol 200, in particular steps 212-218 repeatedly in expectation of such an event, finds in step 210 that too many controller messages 170C have been received, and LSE 404D is not connected, directly or indirectly, to the local lighting zone controller 518. LSE 404D therefore sends a local lighting zone controller repeater designation request 170D to any LSEs 404A, F and the gateway 409 which can hear LSE 404D. While networking graph strategies can vary, in this example LSE 404F is chosen, as the other recipients of the local lighting zone controller repeater designation request 170D are not members of the lighting control group 508. This strategy is employed even though routing through LSE 404A or the gateway 409 would connect LSE 404D to the local lighting zone controller in one hop, rather than two hops through LSEs 404E-F.

LSE 404F will repeat controller messages 170A and lighting zone control network packets 170E on behalf of LSE 404D. FIG. 4C shows the updated network in lighting zone control designation stage 4503. In network control designation stage 503, the lighting system 420 has compensated for the disconnection of LSE 404C, and LSE 404D is re-connected via LSE 404E and LSE 404F to the lighting control group 508 and the local lighting zone controller 518, LSE 404B.

Figure 6:
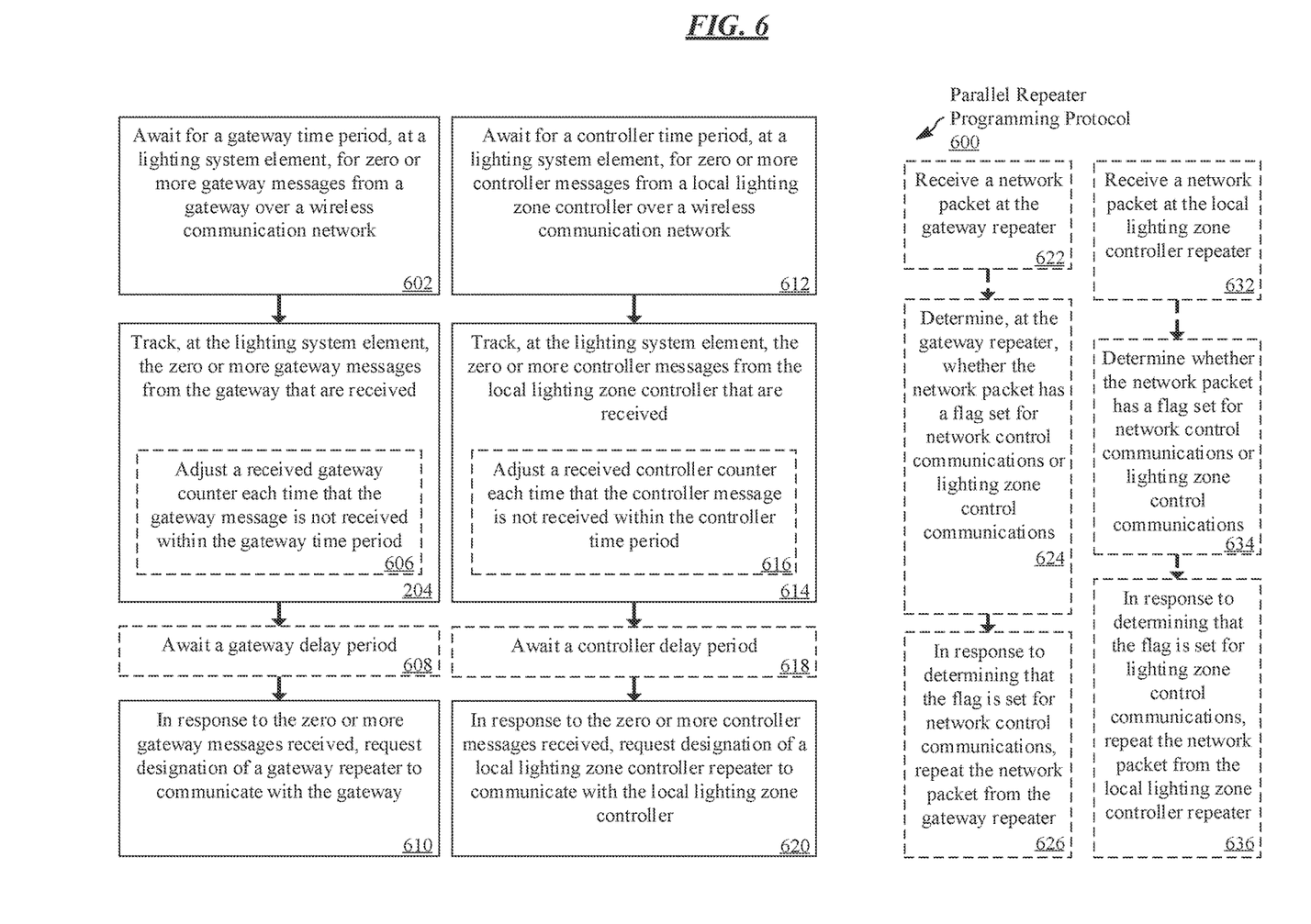
FIG. 6 is an alternative implementation of the parallel repeater programming protocol for the lighting system that is implemented by the gateway and lighting system elements.

FIG. 6 is an alternative implementation of the parallel repeater programming protocol 600 for the lighting system 20 that is implemented by the gateway 9 and lighting system elements 4A-O. Parallel repeater programming protocol 600 enables the lighting network 20 to reduce the repetition of network packets 170E to the intended recipient lighting system elements 4A-O, depending upon the category or flag 171 of the network packet 170E. Broadly, parallel repeater programming protocol 600 differs from parallel repeater programming protocol 200 in that parallel repeater programming protocol 600 tracks the gateway messages 170A and controller messages 170C received during the gateway time period 160 and controller time period 180, rather than counts or number of gateway messages 161 and counts or numbers of controller messages 181. Parallel repeater programming protocol 600 also makes the decision to request a gateway repeater or a local lighting zone controller repeater based upon the received gateway messages 170A and controller messages 170C rather than counts or number of gateway messages 161 and counts or numbers of controller messages 181

In the example of FIG. 6, blocks 602, 612, 622, and 632 can execute asynchronously and independently from one another. Blocks 602-610 are concerned with maintaining connections to facilitate network control network packets 170E. Blocks 612-620 are concerned with maintaining connections to facilitate lighting zone control network packets 170E. Blocks 622-626 are concerned with repeating network control network packets 170E based upon the connections maintained in blocks 602-610. Blocks 632-636 are concerned with repeating lighting zone control network packets 170E based upon the connections maintained in blocks 612-620.

The parallel repeater programming protocol 600 is implemented in the parallel repeater programming 135 of the lighting system elements 4A-O. Execution of the parallel repeater programming 135 stored in a memory 130 by a processor 131 of a given lighting system element 4A causes the given lighting system element 4A to implement blocks 602-610 and 612-620 described below. If the given lighting system element 4A is a gateway repeater for another lighting system element 4B, Execution of the parallel repeater programming 135 stored in a memory 130 by a process 131 of a given lighting system element 4A causes the given lighting system element 4A to implement blocks 622-626. If the given lighting system element 4A is a local lighting zone controller repeater for another lighting system element 4B, Execution of the parallel repeater programming 135 stored in the memory 130 by the processor 131 of the given lighting system element 4A causes the given lighting system element 4A to implement blocks 632-636.

Beginning in block 602, the parallel repeater programming protocol 600 includes awaiting for a gateway time period 160, at a lighting system element 4A for zero or more gateway messages 170A from a gateway 9 over a wireless communication network 25.

Next, in block 604, the parallel repeater programming protocol 200 includes tracking, at the lighting system element 4A, the zero or more gateway messages 170A from the gateway 9 that are received. In some examples, block 604 includes the sub-block 606, where the parallel repeater programming protocol 600 includes adjusting a received gateway counter 163 each time that the gateway message 170A is not received within the gateway time period 160.

In some examples, particularly those which allow missing a percentage of gateway messages 170A, in block 608 the parallel repeater programming protocol 600 awaits a gateway delay period 164.

Finishing now in block 610, the parallel repeater programming protocol 600 includes, in response to the zero or more gateway messages 170A received, requesting designation of a gateway repeater 4B-C, L to communicate with the gateway 9. The request can be made by way of a gateway repeater designation request 170B.

Independently in block 612, the parallel repeater programming protocol 600 includes awaiting for a controller time period 180, at a lighting system element 4A, for zero or more controller messages 170C from a local lighting zone controller 18A over a wireless communication network 25.

Next, in block 614, the parallel repeater programming protocol 600 includes tracking, at the lighting system element 4A, the zero or more controller messages 170C from the local lighting zone controller 18A that are received. In some examples, block 614 includes the sub-block 616, where the parallel repeater programming protocol 600 includes adjusting a received controller counter 183 each time that the controller message 170C is not received within the controller time period 180.

In some examples, particularly those which allow missing a percentage of controller messages 170C, in block 618 the parallel repeater programming protocol 600 awaits a controller delay period 184.

Finishing now in block 620, the parallel repeater programming protocol 600 includes, in response to the zero or more controller messages 181 received, requesting designation of a local lighting zone controller repeater 4B-C to communicate with the local lighting zone controller 18A. The request can be made by way of a local lighting zone controller repeater designation request 170D.

In some examples, independently in block 622, the parallel repeater programming protocol 600 includes receiving a network packet 170E at the gateway 9 repeater. Next, in block 624, the parallel repeater programming protocol 600 includes determining, at the gateway 9 repeater, whether the network packet 170E has a flag set 171 for network control communications or lighting zone control communications. Finishing now in block 626, the parallel repeater programming protocol 600 includes, in response to determining that the flag 171 is set for network control communications, repeating the network packet 170E from the gateway 9 repeater.

In some examples, independently in block 632, the parallel repeater programming protocol 600 includes receiving a network packet 170E at the local lighting zone controller 18A repeater. Next, in block 634, the parallel repeater programming protocol 600 includes determining, whether the network packet 170E has a flag set 171 for network control communications or lighting zone control communications. Finishing now in block 636, the parallel repeater programming protocol 600 includes, in response to determining that the flag 171 is set for lighting zone control communications, repeating the network packet 170E from the local lighting zone controller 18A repeater.

The blocks of parallel repeater programming protocol 200 and parallel repeater programming protocol 600 can be interweaved, and may be exchanged or replaced with one another to facilitate efficient operation. In particular, blocks with two rightmost matching digits (e.g., block 212 and block 612) can be exchanged depending upon particular implementation.

Any of the functionality of the parallel repeater programming protocol 200, including parallel repeater programming 135 and parallel repeater programming protocol 200, described herein for the gateway 9, 309, 409, lighting system elements 4A-O, 304A-L. 404A-F, etc. can be embodied in one more applications or firmware as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate functionality described herein.

In the examples above, the gateway 9, 309, 409, lighting system elements 4A-0, 304A-L. 404A-F, etc. each include a processor. As used herein, a processor 131, is a hardware circuit having elements structured and arranged to perform one or more processing functions, typically various data processing functions. Although discrete logic components could be used, the examples utilize components forming a programmable central processing unit (CPU). A processor 131 for example includes or is part of one or more integrated circuit (IC) chips incorporating the electronic elements to perform the functions of the CPU.

The applicable processor 131 executes programming or instructions to configure the gateway 9, 309, 409, lighting system elements 4A-O, 304A-L. 404A-F, etc. to perform various operations. For example, such operations may include various general operations (e.g., a clock function, recording and logging operational status and/or failure information) as well as various system-specific operations (e.g., daylighting and/or energy management) functions. Although a processor 131 may be configured by use of hardwired logic, typical processors in lighting devices or in light responsive devices are general processing circuits configured by execution of programming, e.g., instructions and any associated setting data from the memories 130 shown or from other included storage media and/or received from remote storage media.

In the examples above, the gateway 9, 309, 409, lighting system elements 4A-0, 304A-L. 404A-F, etc. each include a memory. The memory 130 may include a flash memory (non-volatile or persistent storage), a read-only memory (ROM), and a random access memory (RAM) (volatile storage). The RAM serves as short term storage for instructions and data being handled by the processors 131 e.g., as a working data processing memory. The flash memory typically provides longer term storage.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In the examples above, the gateway 9, 309, 409, lighting system elements 4A-0, 304A-L. 404A-F, etc. each include a network communication interface 132 for wired or wireless communication over one or more networks 25. The networks 25 interconnect the links to/from the network communication interfaces of the devices, so as to provide data communications amongst the gateway 9, 309, 409 and/or lighting system elements 4A-O, 304A-L. 404A-F. Networks 25 may support data communication by equipment at the premises via wired (e.g. cable or fiber) media or via wireless (e.g. WiFi, Bluetooth, ZigBee, LiFi, IrDA, etc.) or combinations of wired and wireless technology.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +5% or as much as +10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method, comprising steps of:
awaiting for a gateway time period, at a lighting system element, for zero or more gateway messages from a gateway over a wireless communication network;
tracking, at the lighting system element, the zero or more gateway messages from the gateway that are received;
in response to the zero or more gateway messages received, requesting designation of a gateway repeater to communicate with the gateway;
awaiting for a controller time period, at the lighting system element, for zero or more controller messages from a local lighting zone controller over the wireless communication network;
tracking, at the lighting system element, the zero or more controller messages from the local lighting zone controller that are received; and
in response to the zero or more controller messages received, requesting designation of a local lighting zone controller repeater to communicate with the local lighting zone controller.

2. The method of claim 1, wherein the gateway repeater is for network control communications.

3. The method of claim 2, wherein the local lighting zone controller repeater is for lighting zone control communications.

4. The method of claim 3, further comprising:
receiving a network packet at the gateway repeater;
determining, at the gateway repeater, whether the network packet has a flag set for network control communications or lighting zone control communications; and
in response to determining that the flag is set for network control communications, repeating the network packet from the gateway repeater.

5. The method of claim 3, further comprising:
receiving a network packet at the local lighting zone controller repeater;
determining whether the network packet has a flag set for network control communications or lighting zone control communications; and
in response to determining that the flag is set for lighting zone control communications, repeating the network packet from the local lighting zone controller repeater.

6. The method of claim 1, wherein:
the step of requesting designation of the gateway repeater to communicate with the gateway includes:
in response to the zero or more gateway messages received being below a received gateway threshold, requesting designation of the gateway controller repeater to communicate with the gateway controller; and
the step of tracking, at the lighting system element, the zero or more gateway messages from the gateway includes:
adjusting a received gateway counter each time that the gateway message is not received within the gateway time period.

7. The method of claim 1, wherein:
the step of requesting designation of the local lighting zone controller repeater to communicate with the local lighting zone controller includes:
in response to the zero or more controller messages received being below a received controller threshold, requesting designation of the local lighting zone controller repeater to communicate with the local lighting zone controller; and
the step of tracking, at the lighting system element, the zero or more controller messages from the local lighting zone controller includes:
adjusting a received controller counter each time that the controller message is not received within the controller time period.

8. The method of claim 1, further comprising:
awaiting a gateway delay period prior to the step of requesting designation of the gateway repeater.

9. The method of claim 1, further comprising:
awaiting a controller delay period prior to the step of requesting designation of the local lighting zone controller repeater.

10. The method of claim 1, wherein:
the lighting system element is included among lighting system elements that form a lighting control group; and the lighting system elements include: (i) a luminaire, (ii) a lighting control device, or (iii) an occupancy, daylight, or audio sensor.

11. A non-transitory machine-readable medium, comprising:
parallel repeater programming, wherein execution of the parallel repeater programming by one or more processors configures one or more computing devices to:
await for a gateway time period, at a lighting system element, for zero or more gateway messages from a gateway over a wireless communication network;
track, at the lighting system element, zero or more gateway messages from the gateway that are received;
in response to the zero or more gateway messages received, request designation of a gateway repeater to communicate with the gateway;
await for a controller time period, at the lighting system element, for zero or more controller messages from a local lighting zone controller over the wireless communication network;
track, at the lighting system element, the zero or more controller messages from the local lighting zone controller that are received; and
in response to the zero or more controller messages received, request designation of a local lighting zone controller repeater to communicate with the local lighting zone controller.

12. The non-transitory machine-readable medium of claim 11, wherein the gateway repeater is for network control communications.

13. The non-transitory machine-readable medium of claim 12, wherein the local lighting zone controller repeater is for lighting zone control communications.

14. The non-transitory machine-readable medium of claim 13, wherein execution of the parallel repeater programming by the one or more processors configures the one or more computing devices to:
receive a network packet at the gateway repeater;
determine, at the gateway repeater, whether the network packet has a flag set for network control communications or lighting zone control communications; and
in response to determining that the flag is set for network control communications, repeat the network packet from the gateway repeater.

15. The non-transitory machine-readable medium of claim 13, wherein execution of the parallel repeater programming by the one or more processors configures the one or more computing devices to:
receive a network packet at the local lighting zone controller repeater;
determine whether the network packet has a flag set for network control communications or lighting zone control communications; and
in response to determining that the flag is set for lighting zone control communications, repeat the network packet from the local lighting zone controller repeater.

16. The non-transitory machine-readable medium of claim 11, wherein:
the requesting designation of the gateway repeater to communicate with the gateway includes:
in response to the zero or more gateway messages received being below a received gateway threshold, requesting designation of the gateway controller repeater to communicate with the gateway controller; and
the tracking, at the lighting system element, the zero or more gateway messages from the gateway includes:
adjusting a received gateway counter each time that the gateway message is not received within the gateway time period.

17. The non-transitory machine-readable medium of claim 11, wherein:
the requesting designation of the local lighting zone controller repeater to communicate with the local lighting zone controller includes:
in response to the zero or more controller messages received being below a received controller threshold, requesting designation of the local lighting zone controller repeater to communicate with the local lighting zone controller; and
the tracking, at the lighting system element, the zero or more controller messages from the local lighting zone controller includes:
adjusting a received controller counter each time that the controller message is not received within the controller time period.

18. The non-transitory machine-readable medium of claim 11, wherein execution of the parallel repeater programming by the one or more processors configures the one or more computing devices to:
await a delay period prior to the step of requesting designation of the gateway repeater.

19. The non-transitory machine-readable medium of claim 11, wherein execution of the parallel repeater programming by the one or more processors configures the one or more computing devices to:
await a delay period prior to the step of requesting designation of the local lighting zone controller repeater.

20. The non-transitory machine-readable medium of claim 11, wherein the one or more computing devices include: (i) a luminaire, (ii) a lighting control device, or (iii) an occupancy, daylight, or audio sensor.

* * * * *